United States Patent

Terano et al.

[11] Patent Number: 5,127,280
[45] Date of Patent: Jul. 7, 1992

[54] HEATER CONTROL ASSEMBLY

[75] Inventors: Naoki Terano; Satoshi Sugimoto; Satoshi Kozawa; Takahiko Fukuyama, all of Niwa, Japan

[73] Assignee: Kabushiki Kaisha Tokai Rika Denki Seisakusho, Aichi, Japan

[21] Appl. No.: 654,690

[22] Filed: Feb. 13, 1991

[30] Foreign Application Priority Data

Feb. 19, 1990 [JP] Japan ............................ 2-15562[U]

[51] Int. Cl.⁵ ............................................. F16H 27/08
[52] U.S. Cl. ................................. 74/89; 74/501.6; 454/159; 454/159
[58] Field of Search ............... 74/89.13, 89.18, 89, 74/501.6, 512; 62/161; 236/51; 98/2, 2.08

[56] References Cited

U.S. PATENT DOCUMENTS

| | | | |
|---|---|---|---|
| 2,910,743 | 11/1959 | Muhn | 74/89 |
| 3,026,740 | 3/1962 | Covert | 74/89.13 |
| 3,075,407 | 1/1963 | Werner | 74/501.6 |
| 3,118,321 | 1/1964 | Rinke | 74/89.13 |
| 3,362,635 | 1/1968 | Forte | 236/51 |
| 3,369,415 | 2/1968 | Slawsky | 74/89 |
| 3,472,084 | 10/1969 | Ellis | 74/89 |
| 3,894,445 | 7/1975 | Rowe | 74/512 |
| 4,401,077 | 8/1983 | Earl | 74/501.6 |
| 4,646,206 | 2/1987 | Bauer et al. | 98/2.08 |
| 4,653,386 | 3/1987 | Hayakawa et al. | 98/2 |
| 4,656,926 | 4/1987 | Bauer et al. | 98/2 |
| 4,924,724 | 5/1990 | Yoshimura | 74/50.16 |
| 4,926,654 | 5/1990 | Johnson | 236/51 |

Primary Examiner—Leslie A. Braun
Assistant Examiner—Winnie Yip

[57] ABSTRACT

A heater control assembly has a transmission mechanism including a first bevel gear rotatable together with a rotary knob, a second bevel gear engaging with the first bevel gear, a first spur gear rotatable together with the second bevel gear, and a second spur gear engaging with the first spur gear. The lever has one end connected with the cable and the other end which is fixed on the second spur gear so that the lever may swing in accordance with rotation of the second spur gear to pull and push the cable.

8 Claims, 2 Drawing Sheets

HEATER CONTROL ASSEMBLY

BACKGROUND OF THE INVENTION

1. Field of the invention

The present invention generally relates to a heater control assembly mounted on an instrument panel of an automobile, for controlling the amount of blown air and the temperature to be set, and more particularly to a heater control assembly of a type in which it is connected by means of a cable to an air conditioner mounted in the automobile.

2. Description of the related art

According to a lever-type of the conventional heater control assembly, there is provided an operation lever arranged in front of an instrument panel, and a cable arranged behind the instrument panel and connected with the operation lever and the air conditioner. The cable is pulled and pushed by swinging the operation lever to control the air conditioner.

Further, according to a rotary-type of the conventional heater, there is provided a rotary knob arranged in front of an instrument panel, the same cable as described above and a transmission mechanism for converting the rotational movement of the rotary knob into an substantially linear movement of the cable to operate the air conditioner.

There is shown one of the rotary type of heater control assembly in U.S. Pat. No. 4,656,926. This conventional control assembly includes a rotary knob arranged in front of an instrument panel, a cable connected with an air conditioner, a lever connected with one end of the cable, and a transmission mechanism for transmitting a torque generated on the rotary knob to the lever. The transmission mechanism includes a first bevel gear rotatable together with the rotary knob and a second bevel gear engaging with the first bevel gear. The second bevel gear has a bottom surface provided with a curved cam groove in which a pin-like cam follower mounted on the lever is inserted.

With the above-described mechanism of the conventional assembly, when the rotary knob is rotated, the first and second bevel gears are rotated so that the lever may swing by the engagement of the cam groove and the pin-like cam follower to pull and push the cable in a linear direction, resulting in the control of the amount of blown air and the temperature to be obtained.

Meanwhile, in the above mechanism a play between the pin-like cam follower and the cam groove must be maintained in order to ensure a smooth movement of the cam groove and the pin-like cam follower. This means that the lever can swing within a slight angle even if the second bevel gear is stopped, so that the position of the cable is unstable, resulting in an undesirable accuracy of control of the air conditioner.

SUMMARY OF THE INVENTION

Accordingly, an essential object of the present invention is to provide a heater control assembly in which the accuracy of control of the air conditioner may be improved.

In accomplishing this and other objects, according to the present invention, there is provided a heater control assembly having a rotary knob to be arranged in front of an instrument panel, lever means to be connected with one end of a cable extending from an air conditioner, and a transmission mechanism for transmitting a torque of the rotary knob to the lever means so as to pull and push the cable. The transmission mechanism comprises a first bevel gear rotatable together with the rotary knob, a second bevel gear engaging with the first bevel gear, a first spur gear rotatable together with the second bevel gear, and a second spur gear engaging with the first spur gear. The lever means has one end connected with the cable and the other end which is fixed on the second spur gear so that the lever means may swing in accordance with a rotation of the second spur gear to pull and push the cable.

With the above construction according to the present invention, when the rotary knob is rotated, its torque is transmitted to the second bevel gear through the first bevel gear so that the first and second spur gears are rotated, resulting in the lever means swings in the same angle as the rotational angle of the second spur gear.

According to the present invention, there is not so large play such as that provided in the conventional assembly as described previously, and there is only a backlash between the gears. Therefore, the position of the lever means and the cable is very stable as far as the rotary knob is fixed. Thus, the improved accuracy of control of the air conditioner may be achieved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

These and other objects and features of the present invention will become apparent from the following description taken in conjunction with the preferred embodiment thereof with reference to the accompanying drawings which are given by way of illustration only, and thus are not limitative of the present invention, and in which.

DETAILED DESCRIPTION OF THE INVENTION

Figure 1:
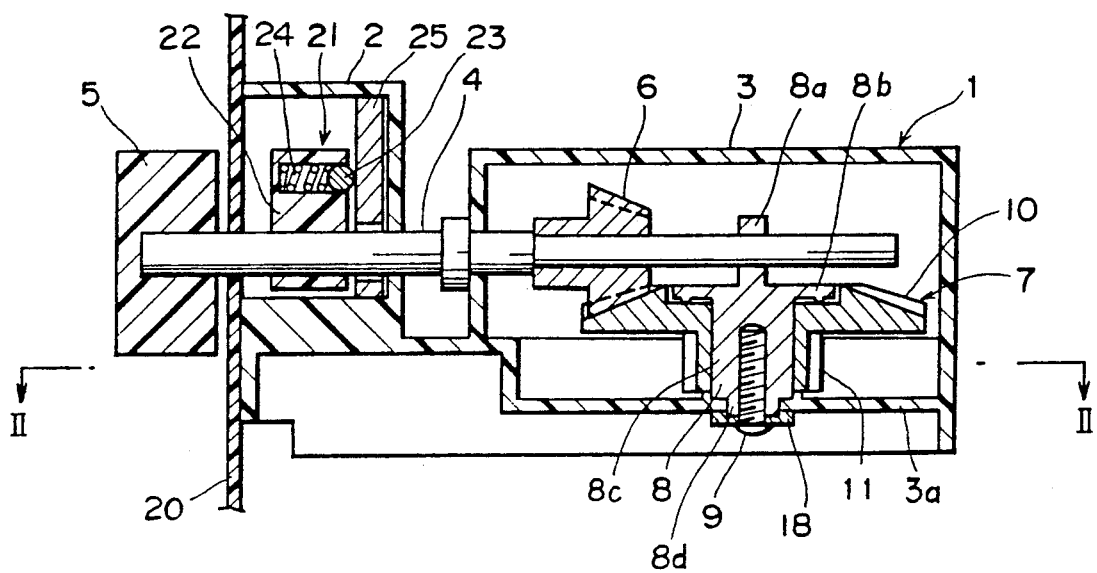
FIG. 1 is a section of a heat control assembly according to one preferred embodiment of the present invention.

Before the description of the present invention proceeds, it is to be noted that like parts are designated by like reference numerals throughout the accompanying drawings.

Figure 3:
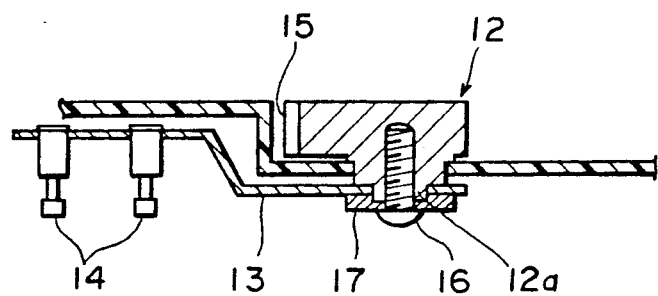
FIG. 3 is a section taken along a line III—III in FIG. 2.
Figure 2:
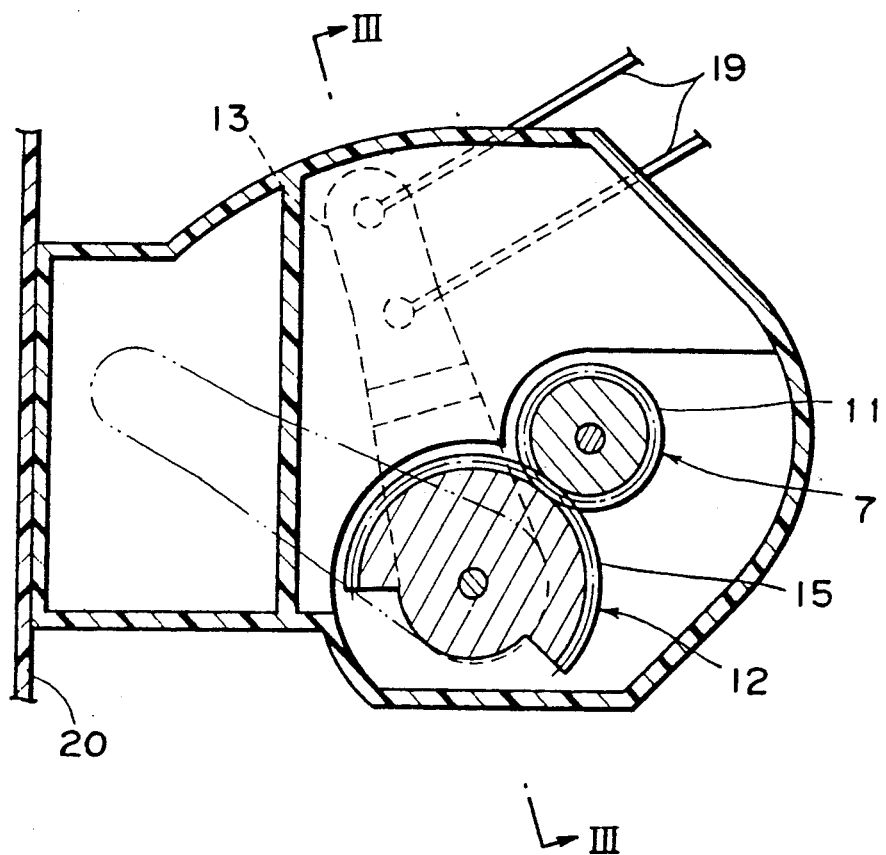
FIG. 2 is a section taken along a line II—II in FIG. 1.

Referring to FIGS. 1-3, the heater control assembly includes a transmission mechanism for transmitting a torque of a rotary knob 5 to a pivotal lever 13. The transmission mechanism is accommodated in a casing 1 which is mounted behind an instrument panel 20. The casing 1 comprises a first part 2 near the instrument panel 20 and a second part 3 far from the instrument panel 20. A shaft 4 extends through the instrument panel 20, the first part 2 and second part 3 and is supported rotatably thereby. One end protruding forwardly of the shaft is provided with the rotary knob 5.

There is provided, in the first part 2, a positioner 21 for setting the rotational position of the shaft 4. The positioner 21 includes a holder 22 for holding a spring 24 and a ball 23 urged by the spring 24, and a positioning plate 25. The holder 22 is fixed on the shaft 4 so as to rotate together with the shaft. The ball 23 is urged by the spring 24 toward confronting face of the plate 25. The plate 25 is provided, in said surface thereof, with a plurality of click recesses (not shown) for positioning the ball 23. The click recesses are arranged on a imaginary circle line, the center of which corresponds to the central axis of the shaft 4, with equal interval spaced. Therefore, the knob 5, accordingly the shaft 4, may be stopped on each rotational position.

A bevel gear 6 is mounted on the inner end of the shaft 4, in the second part 3. Also, in the second part 3, there is provided a first gear member 7 having a second bevel gear 10 which is engaged with the first bevel gear 6. The gear member 7 is supported rotatably by a pin member 8.

The pin member 8 comprises a cylindrical main part 8c around which the second bevel gear 10 is rotatable, a flange 8b which is formed at the upper portion of the cylindrical main part 8c to hold the second bevel gear 10, an upper projection 8a which extends from the flange 8b and is supported by a suitable portion of the second part 3 (not shown), and a lower projection 8d which is fixedly inserted in a hole formed in the bottom 3a of the second part 3. The pin member 8 is secured on the second part 3 by a screw 9 which is threaded into the pin member 8 from below with a washer 18 interposed therebetween.

The first gear member 7 also includes a first spur gear 11 which is formed integrately with and below the second bevel gear 10 so as to rotate around the pin member 8.

A second gear member 12 includes a second spur gear 15 which is rotatably mounted on the bottom 3a of the second part 3 so as to engage with the first spur gear 11, as shown in FIGS. 2 and 3. The second gear member 12 has a lower projection 12a which is inserted in a hole formed in one end of a lever 13. The lever 13 is secured to the second spur gear 12 by a screw 16 which is threaded into the spur gear 15 with a washer 17 interposed therebetween. The other end of the lever 13 is provided with a pair of attachment pin members 14 with which the respective cables 19 extending from the air conditioner are connected.

With the above arrangement according to a preferred embodiment of the present invention, the rotation of the rotary knob 5 causes a rotation of the shaft 4 and the first bevel gear 6, resulting in a rotation of the gear member 7. Subsequently, The rotation of the second spur gear 12 causes a swinging of the lever 13.

The rotational angle or position of the shaft 4 is set stable by the engagement of the ball 23 and the click recesses. In the above mechanism, there is not a play other than the small backlash between the gears 6, 10, 8 and 12. Thus, the air conditioner can be controlled very accurately.

Although the present invention has been fully described by way of example with reference to the accompanying drawings, it is to be noted here that various changes and modifications will be apparent to those skilled in the art. Therefore, unless otherwise such changes and modifications depart from the scope of the present invention as defined by the appended claims, they should be construed as included therein.

What is claimed is:

1. A heater control assembly comprising a rotary knob positioned in front of an instrument panel, a casing, lever means connected with one end of a cable extending from an air conditioner, and a transmission mechanism accommodated in the casing for transmitting a torque of the rotary knob to the lever means so as to pull and push the cable, where, the transmission mechanism comprises a first bevel gear rotatable together with the rotary knob, a first gear member having a second level bevel gear engaging with the first bevel gear and a first spur gear coaxially integrated into and rotatable with the second bevel gear, a pin member mounted on the casing to rotatably support the second bevel gear and the first spur gear of the first gear member, and a second spur gear engaging with the first spun gear, the pin member having a main part, the second bevel gear and the first spur gear being rotatable around the main part of the pin member, one end portion of the main part being secured to the casing and a flange extending from the other end portion of the main part, the second bevel gear and the first spur gear being rotatably held between the flange and the one end portion of the main part secured to the casing;

the lever means having one end connected with the cable and the other end being fixed on the second spur gear so that the lever means may swing in response to rotation of the second spur gear to pull and push the cable.

2. The heater control assembly as claimed in claim 1, wherein the rotary knob and the first bevel gear are coaxially fixed around a shaft so that they may rotate together, the second bevel gear and the first spur gear are coaxially assembled together.

3. The heater control assembly as claimed in claim 1, wherein the casing in which the transmission mechanism is accommodated is behind the instrument panel.

4. The heater control assembly as claimed in claim 3, wherein the second bevel gear and the first and second spur gears are rotatably supported by the casing.

5. The heater control assembly as claimed in claim 1, further comprising a shaft connecting the rotary knob and the first gear, the shaft having a positioner mounted thereon, the positioner being adjacent a plate and the positioner having a ball detent engageable with the plate as the knob is rotated in order to ensure positioning of the rotary knob.

6. The heater control assembly as claimed in claim 5, wherein the casing further comprises a first part and a second part both positioned behind the instrument panel, the shaft extends through the instrument panel and the first and second parts, the positioner and plate are located in the first part and the first gear and first gear member are located in the second part of the casing.

7. The heater control assembly as claimed in claim 1, wherein two cables extend from the air conditioner each having the one end connected to the lever means by a pair of attachment pin members, a single lever being provided for the pair of attachment pin members.

8. The heater control assembly as claimed in claim 1, wherein the main part of the pin member further has an upper projection extending above the flange, the heater control assembly further comprising a shaft extending from the rotary knob through the first gear and through the upper projection of the pin member, the shaft being rotatable in order to rotate the first gear and the upper projection holding the shaft in position.

* * * * *